(12) United States Patent
Escott

(10) Patent No.: US 7,813,771 B2
(45) Date of Patent: Oct. 12, 2010

(54) VEHICLE-STATE BASED PARAMETER ADJUSTMENT SYSTEM

(75) Inventor: Alex Escott, Vancouver (CA)

(73) Assignee: QNX Software Systems Co., Ottawa, Ontario (CA)

(*) Notice: Subject to any disclaimer, the term of this patent is extended or adjusted under 35 U.S.C. 154(b) by 1530 days.

(21) Appl. No.: 11/031,373

(22) Filed: Jan. 6, 2005

(65) Prior Publication Data

US 2006/0145537 A1 Jul. 6, 2006

(51) Int. Cl.
*H04M 1/00* (2006.01)

(52) U.S. Cl. ............... 455/569.2; 455/569.1; 455/575.9; 455/90.2; 701/1; 701/36; 701/49

(58) Field of Classification Search ............... 455/569.1, 455/569.2, 570, 557, 556.1, 418, 419, 575.9, 455/90.2; 701/1, 36, 49
See application file for complete search history.

(56) References Cited

U.S. PATENT DOCUMENTS

| | | | |
|---|---|---|---|
| 2,080,554 A | 10/1934 | Wolff | |
| 3,431,498 A | 3/1969 | Varterasian et al. | |
| 4,476,571 A | 10/1984 | Tokumo et al. | |
| 4,942,571 A | 7/1990 | Moller et al. | |
| 4,944,018 A | 7/1990 | Bose et al. | |
| 5,027,432 A | 6/1991 | Skala et al. | |
| 5,034,984 A | 7/1991 | Bose | |
| 5,081,682 A | 1/1992 | Kato et al. | |
| 5,081,707 A | 1/1992 | Schorman et al. | |
| 5,107,539 A | 4/1992 | Kato et al. | |
| 5,204,971 A | 4/1993 | Takahashi et al. | |
| 5,483,692 A | 1/1996 | Person et al. | |
| 5,917,268 A | 6/1999 | Takagi et al. | |
| 6,009,396 A | 12/1999 | Nagata | |
| 6,249,720 B1 * | 6/2001 | Kubota et al. | 701/1 |
| 6,778,672 B2 | 8/2004 | Breed et al. | |
| 6,891,809 B1 | 5/2005 | Ciccone et al. | |
| 6,980,663 B1 | 12/2005 | Linhard | |
| 2003/0020603 A1 | 1/2003 | DeLine et al. | |
| 2003/0061049 A1 | 3/2003 | Erten | |
| 2004/0186936 A1 * | 9/2004 | Wang et al. | 710/72 |

FOREIGN PATENT DOCUMENTS

| | | |
|---|---|---|
| EP | 0729227 | 8/1996 |
| EP | 0893308 | 1/1999 |
| EP | 1493993 | 1/2005 |
| JP | 06-335083 | 12/1994 |
| JP | 2001-119470 | 4/2001 |
| JP | 2004-080647 | 3/2004 |
| JP | 2004-128751 * | 4/2004 |
| KR | 2001-0111137 | 12/2001 |
| WO | WO 03/001885 | 1/2003 |
| WO | WO 2004/103773 | 12/2004 |

* cited by examiner

*Primary Examiner*—Ajit Patel
*Assistant Examiner*—Khai M Nguyen
(74) *Attorney, Agent, or Firm*—Brinks Hofer Gilson & Lione

(57) ABSTRACT

The operation of a vehicle electronic module is influenced by vehicle-state received on a vehicle communication bus. The electronic module analyzes vehicle-state data that includes information about the vehicle's environment. The electronic module improves or maintains electronic module performance by adjusting communication processing parameters to improve driver or passenger communication.

39 Claims, 4 Drawing Sheets

VEHICLE-STATE BASED PARAMETER ADJUSTMENT SYSTEM

BACKGROUND OF THE INVENTION

1. Technical Field

This invention relates to vehicle electronics systems. In particular, the invention relates to a system for adjusting parameters of vehicle electronics systems based on vehicle-state information.

2. Related Art

The electronic technologies supporting and incorporated into cars, trucks, and other vehicles, have developed rapidly and have become quite powerful in a short time. Vehicle electronics systems include fundamental electronic modules ranging from engine controllers to anti-lock braking systems. Vehicle electronic modules also interface sophisticated consumer technologies to the vehicle, including global positioning systems, mobile telephones, and high quality stereo sound systems.

The electronic modules often perform complex and sophisticated processing. A communication electronic module may apply echo cancellation, noise suppression, and other processing to improve audio quality for mobile communications. Despite the efforts of the audio electronic module, external factors can detrimentally affect audio quality by adding noise, masking, corrupting, or otherwise influencing audio signals. Without knowledge of the current vehicle state or changes in vehicle state, the electronic module may not be able to optimally perform its task. In general a vehicle operating environment can adversely affect the operation and performance of many electronic modules.

A need exists for addressing the problems described above.

SUMMARY

This invention provides a vehicle electronic module that adjusts its operation in response to vehicle-state. The vehicle electronic module monitors vehicle-state through a communication bus. The electronic module analyzes vehicle-state data that includes information about the vehicle's environment. The electronic module improves or maintains electronic module performance by adjusting communication processing parameters to improve driver or passenger communication.

The electronic module may include a vehicle interface, a memory, and a processor. The processor is coupled to the vehicle interface and the memory and executes instructions stored in the memory. The instructions cause the module to receive vehicle-state through the interface. The module determines an adjustment to one or more processing parameters based on the vehicle-state and initiates an update of the processing parameter according to the determined adjustment.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
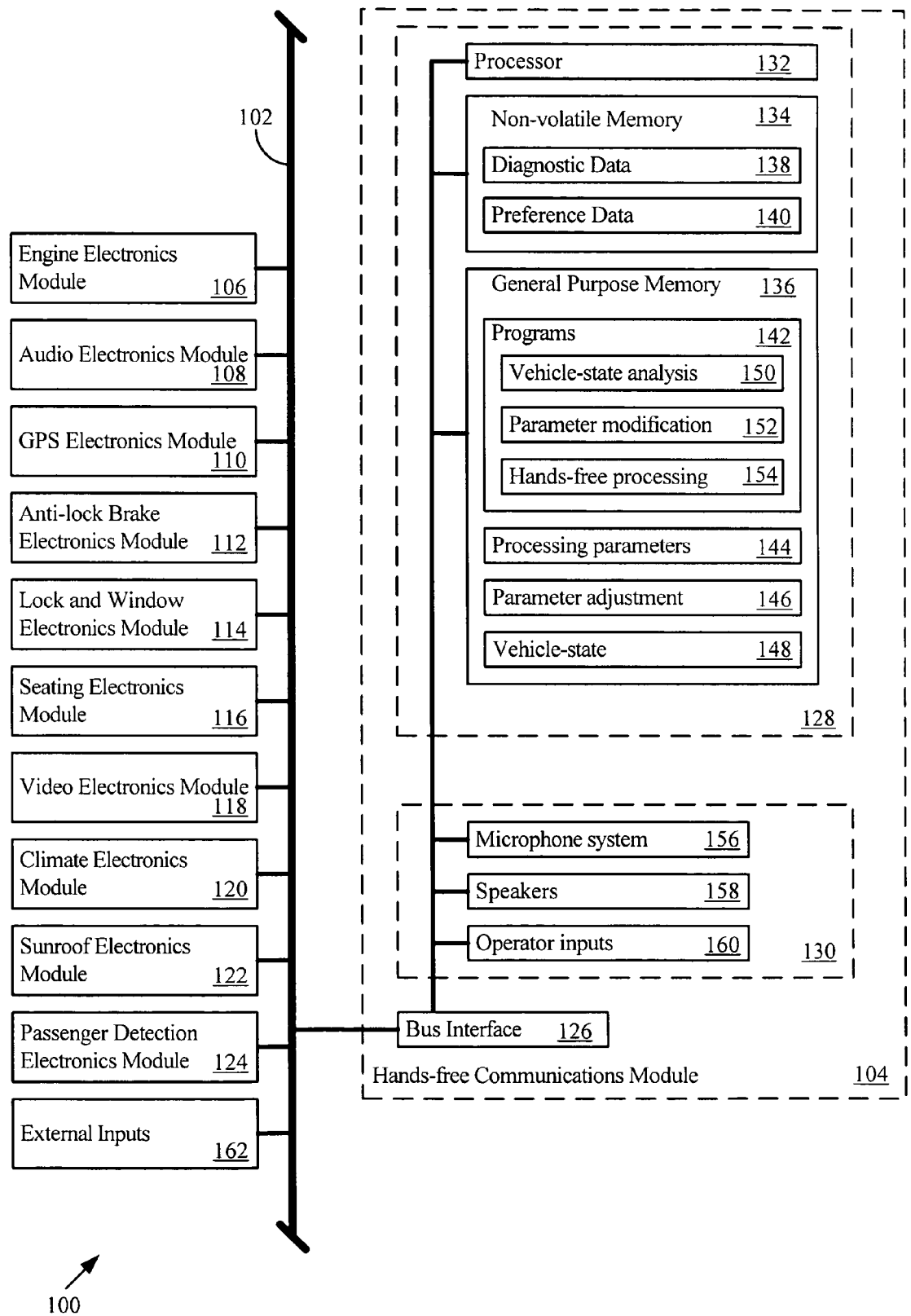
FIG. 1 is a vehicle electronics system.

In FIG. 1, a vehicle electronics system 100 includes a vehicle communication bus 102, a hands-free communication module 104, and other electronic modules 106, 108, 110, 112, 114, 116, 118, 120, 122, and 124. The electronic modules 104-124 are not limited to the form or function described below. The vehicle may incorporate any electronic module or distribution of electronic modules that implements any processing performed in the vehicle.

The electronic modules 106-124 shown in FIG. 1 include an engine control or power train module 106, that monitors and adjusts a vehicle engine operation; an audio electronics module 108, for providing stereo system volume, channel, tuning, audio playback, and associated sound system controls to a vehicle occupant; and a global positioning system control module 110 that maintains vehicle positioning, provides route finding, and/or implements other navigational operations. Other electronic control modules may include the anti-lock brake control module 112 that assists vehicle braking; a lock and window control module 114, for operating locks and windows; and the seating control module 116, for adjusting seat positioning or seat temperature.

A video control module 118 may govern a DVD player and LCD display or other video display, and a climate control module 120 may monitor and maintain a vehicle climate by controlling air-conditioning and/or heating levels, fan speeds, and/or other climate functions. A sunroof control module 122 provides an operator interface for opening a sun or moon roof, while the passenger detection module 124 may determine the presence, position, identification, or other characteristic of vehicle passengers. The passenger detection module 124 may employ ultrasonic, video, infra-red, electromagnetic, or other sensors in the passenger compartment or vehicle seats that detect occupancy or identify characteristics of a driver or any passenger.

The hands-free communication module 104 implements a wireless communication system in the vehicle. The hands-free communication module 104 includes a vehicle communication bus interface 126, a processing system 128, and an interface and control system 130. The processing system 128 includes a processor 132, a non-volatile memory 134, and a general purpose volatile memory 136.

The non-volatile memory 134 may store diagnostic data 138, occupant preference data 140, and/or other data. The processor 132 may perform diagnostic checks of the hands-free module circuitry or logic and store diagnostic data 138 into the non-volatile memory 134. The processor 132 may also store operator preference data 140, such as volume presets, balance settings, equalizer settings, contact numbers, and other preference data, in the non-volatile memory 134.

The general purpose memory 136 may store programs 142 and program data for the processor 132. The general purpose memory 136 may also store hands-free communication system processing parameters 144 and a processing parameter adjustment 146. The vehicle-state 148 may also be retained in the memory 136.

The programs 142 may include a vehicle-state analysis program 150, a parameter modification program 152, and hands-free processing programs 154. The processing programs 154 may include programs that establish, maintain, and disconnect calls, perform noise reduction, control volume levels, process signals from one or more microphones, apply filters to the signals, perform voice recognition, process voice commands for the hands-free communication system, or take other processing actions.

The interface and control system 130 may include a microphone system 156, speakers 158, and operator inputs 160. The microphone system 156 may include one or more microphones. When multiple microphones are used, the hands-free communication module 104 may perform beamforming to control beam width, beam focus, or other beamforming parameters of signals received from the microphones. The speakers 158 transform signals to audible sounds and may act as an output for communication systems in the vehicle. The operator inputs 160 may provide operator controls for volume, call initiation or termination, or other functions of the hands-free communications module.

The vehicle communication bus 102 connects to the electronic control modules 104-124. The electronic control modules 104-124 may support one or many vehicle protocols. The bus interface 126 may employ a pre-selected protocol, or may automatically detect and employ the protocol used on the bus 102. The vehicle communication bus 102 may be any type of vehicle bus, including a Class A, B, or C bus, any on-board diagnostic system (OBD) bus or protocol, Emissions/Diagnostics bus, Mobile Media bus, or X-by-Wire bus. Other examples of vehicle communication buses 102 include a Controller Area Network (CAN) bus, serial bus, Local Interconnect Network (LIN) bus, or Media Oriented Systems Transport (MOST).

The bus interface 126 includes interface circuitry and/or logic for the vehicle communication bus 102. The bus interface 126 may provide a unidirectional or bi-directional link between the electronic modules 104-124 over the vehicle communication bus 102. Any of the electronic modules 104-124 may receive and/or transmit vehicle bus messages including commands, data, or both on the vehicle communication bus 102 to one or more of the electronic modules 104-124.

The bus interface 126 may include a wireless transmitter and/or receiver. The wireless bus interface 126 may then transmit and receive messages from the communication bus 102 without a hardwired connection. The bus interface 126 may employ any wireless communication protocol such as Bluetooth, WLAN, WiFi, Hiper/LAN or other protocols.

Figure 2:
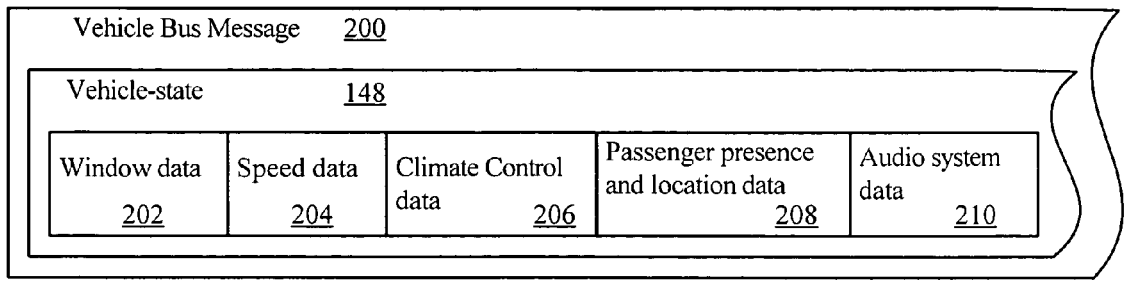
FIG. 2 is a vehicle bus message.

In FIG. 2, a bus message 200 includes a vehicle-state 148. The vehicle state 148 may include data representing one or more aspects or characteristics of the vehicle. The vehicle-state 148 may be transmitted in a single bus message or multiple bus messages. Each electronic module 104-124 may transmit, synchronously or asynchronously, vehicle-state data, in real-time, at pre-selected intervals, in response to queries by other electronic modules 104-124, or at any other time. Alternatively, transmission of the vehicle-state data may be synchronized to the timing of other vehicle systems.

The vehicle-state 148 may include window data 202, speed data 204, and climate control data 206. The vehicle-state 148 may also include passenger data (e.g., presence data) and location data 208 and audio system data 210. Other characteristics of the vehicle may be included in the vehicle-state and other status data may be present, such a timestamp associated with the data that indicates a present time and/or the time at which any vehicle-state was provided.

The time may be generated by any of the electronic modules 104-124, by other circuitry and/or logic in the vehicle, or may be obtained from an external input 162. The external input 162 may provide other data, including vehicle status data. The external input 162 may be a diagnostic input such as that employed by a vehicle repair shop to test vehicle operation.

The window data 202 may indicate a position for an opening such as a window, a moon roof or sun roof, or another aperture that may be closed or opened. The position data may indicate the extent to which an aperture is open or closed. The window control module 114 may provide the window data 202. The speed data 204 may indicate vehicle speed and/or acceleration and may be monitored by the engine electronics module 106. The climate control data 206 may indicate whether air-conditioning, fans, defrosters, heating, or other climate control are active, and their settings. The climate electronics module 120 may provide the climate control data 206

The passenger presence and location data 208 may indicate whether passengers are present, their locations, their positions, their identifications, or any combination thereof. The passenger detection module 124 may provide the presence and location data 210. The audio system data 212 may represent stereo system volume settings, balance settings, fader settings, equalizer settings, CD/cassette/radio/DVD operational modes, or other audio or multimedia entertainment system parameters. The audio electronics module 108 may provide the audio system data 212.

The vehicle bus message 200 may originate from any control module 104-124, the external input 162, or from another source. The hands-free control module 102 monitors the bus interface 126 for vehicle bus messages. In other implementations, the hands-free control module 102 may transmit a vehicle status request message on the vehicle communication bus 102 that queries a control module 104-124 or external input 162 for vehicle-state.

The processor 132 receives the vehicle bus messages 200 and the vehicle-state 148 through one or more bus interfaces 126. The processor 132 may establish, maintain, or track the vehicle-state 148 in the general purpose memory 136. The processor 132 may maintain historical vehicle-states as well as a current vehicle state.

A vehicle-state may vary significantly while a vehicle is in use. Some vehicle-states may adversely affect speech quality, signal quality, or other performance aspects of the hands-free communication module 104. As windows, sunroofs, or any other apertures are opened and closed, additional noise sources such as an increased airflow or ambient noises may effect, corrupt, or mask communication signals. Activating a fan may also contribute to the surrounding noise. Passengers and objects may also affect sound quality by blocking microphones or speakers.

In response to the vehicle-state, the processor 132 may determine an adjustment 146 to any of the hands-free processing parameters 144. The adjustment 146 may address the adverse effects of the vehicle-state 148 on a hands-free communication module 104. The processor 132 may execute a vehicle-state analysis program 150 to determine an adjustment to the processing parameters 144 by a parameter modification program 152.

Figure 3:
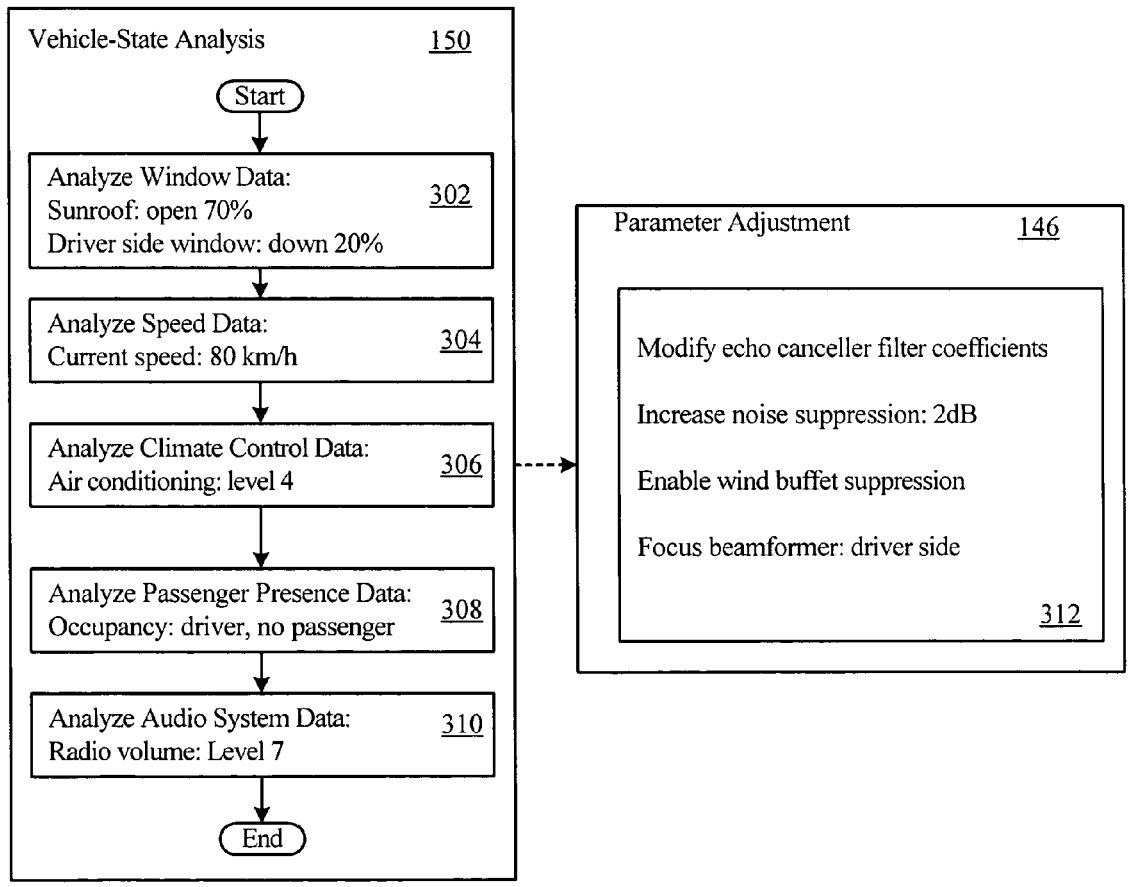
FIG. 3 are vehicle statuses and parameter adjustments.

FIG. 3 shows the acts that may be taken by the vehicle-state analysis program 150. The analysis program 150 may examine the vehicle-state 148 to determine operating conditions of a vehicle. The analysis program 150 may examine the window data 202 (Act 302). The window data 202 may indicate that the sunroof is open about 70% and that the driver side window is down about 20%. The analysis program 150 may also examine the speed data 204 (Act 304) and the climate control data 206 (Act 306). The speed data 204 may indicate the current vehicle speed. The climate control data 206 may indicate that the air conditioning is on, and set to level 4.

The analysis program 150 also may examine the passenger presence data 208 (Act 308) and the audio system data 210 (Act 310). The passenger presence data 208 may indicate a driver is present and a passenger is absent. The audio system data 210 may indicate the status of a radio (e.g., the radio is on, and the volume is set to level 7).

Based on one or more of the vehicle-states, the analysis program 150 may determine one or more parameter adjustments 146. The parameter adjustments may be an adjustment to any variable, processing algorithm, or other aspect of the hands-free communication module 104 or for another module 106-124. The analysis program 150 may determine the adjustments 146 through a lookup table (e.g., indexed by any vehicle state data), by applying equations that relate vehicle state to an adjustment (e.g., an equation that relates speed to noise suppression), by applying heuristic rules to determine the adjustment (e.g., when windows are open, increase gain level), or in other manners.

In FIG. 3, four parameter adjustments 312 are shown. The parameter adjustments 312 may include modifying echo canceller filter coefficients and increasing noise suppression by a predetermined or calculated amount (e.g., 2 dB). The parameter adjustments 312 also may include flags, parameters, or messages prepared, set, and/or sent to other programs to enable wind buffet suppression processing and focus the beamformer on the driver's side of the vehicle. Other parameter adjustments may be made, such as gain level adjustments, microphone or speaker activation or deactivation adjustments, sound processing algorithm selection or activation instructions, or other adjustments. One or more parameter adjustments 312 may be made together or may be made individually.

The parameter modification program 152 may provide the hands-free processing programs 154 with the parameter adjustments 312. The parameter modification program 152 may update processing parameters by storing new parameters in memory, updating existing parameters in memory, communicating the new parameters to a hands-free processing program 154, or in other manners. According to the parameter adjustments 312, the parameter modification program 152 may store new filter coefficients for echo canceller circuitry or logic, modify a noise suppression setting so that an extra level of noise suppression is applied, enable a wind buffet or rain removal suppression algorithm, and direct the beamformer to focus on the driver side.

The parameter adjustments may apply to parameters described in the following patent applications, each incorporated herein by reference: U.S. patent application Ser. No. 10/688,802, filed 16 Oct. 2003, titled "System for Suppressing Wind Noise"; U.S. patent application Ser. No. 11/002,328, filed 1 Dec. 2004, titled "Reverberation Estimation and Suppression System"; and U.S. patent application Ser. No. 10/973,575, filed 26 Oct. 2004, titled "Periodic Signal Enhancement System." The parameter adjustments may apply to parameters of other processing systems, whether or not the processing systems are communication systems.

The hands-free communication module 104 adapts its processing to the vehicle-state. Conditions that may adversely affect sound quality may be detected and countered. Thus, the hands-free communication module 104 may provide better quality sound output.

Figure 4:
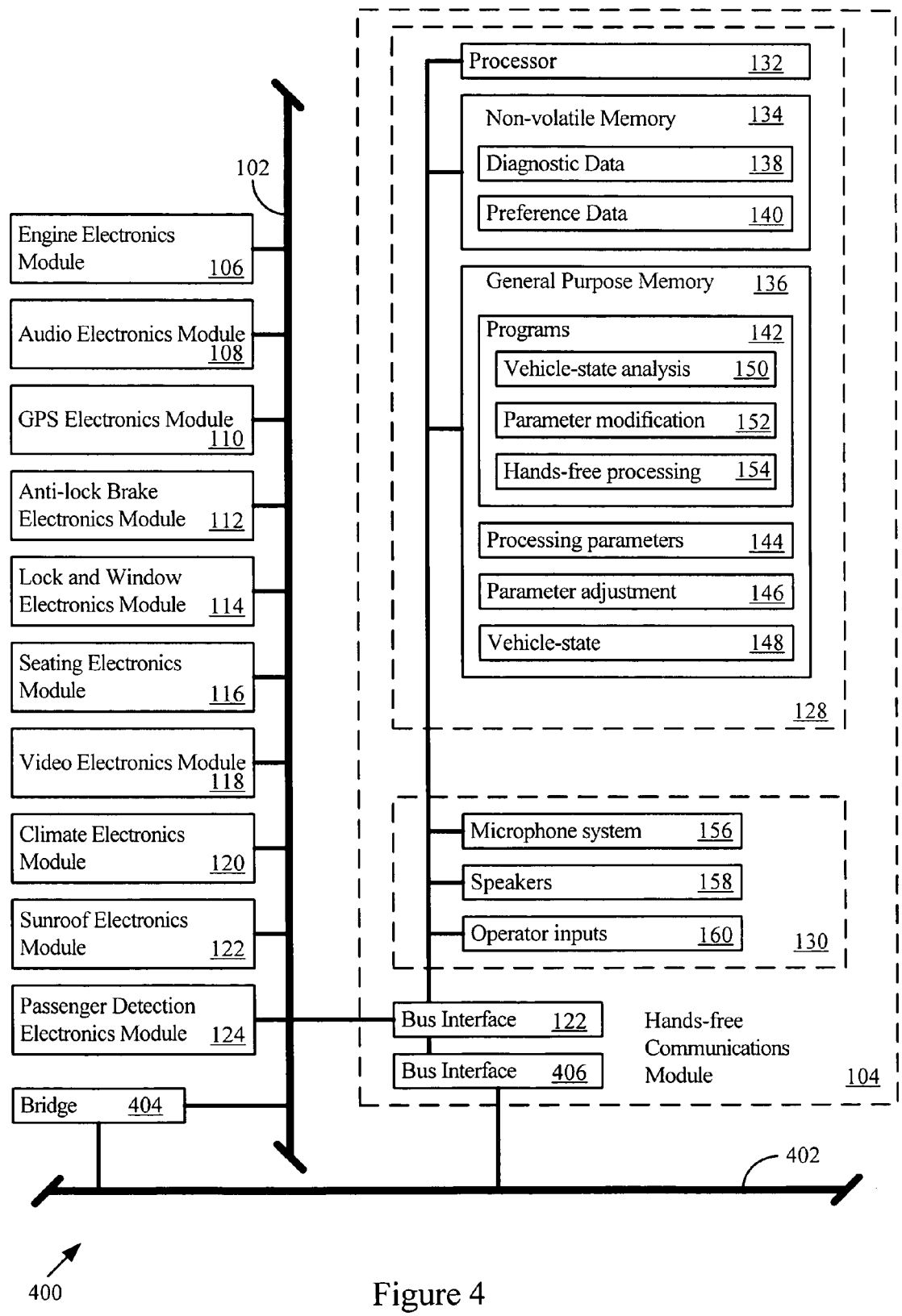
FIG. 4 is a vehicle electronics system.

In FIG. 4, a vehicle electronics system 400 includes a first vehicle communication bus 102 and a second vehicle communication bus 402. The busses 102 and 402 may carry different types of information, such as multi-media entertainment system data, vehicle-state data, safety data, diagnostic data, or other data. Interconnecting circuitry, such as a bridge 404, may connect the busses 102 and 402. Alternatively or additionally, the hands-free communication module 104 may include a bus interface 406 that links modules to the second bus 402. Like the bus interface 126, the bus interface 406 may be a wireless bus interface employing any desired communication protocol.

When vehicle-state is not available on one bus (e.g., bus 402), the electronic modules 104-124 may query or interrogate, or monitor other buses to obtain the vehicle-state (e.g., bus 102). The bridge 404 may transfer vehicle-state between busses 102 and 402. Alternatively or additionally, an electronic module 104-124 may obtain vehicle-state directly from a bus through one or both of the bus interfaces 122 and 406.

Figure 5:
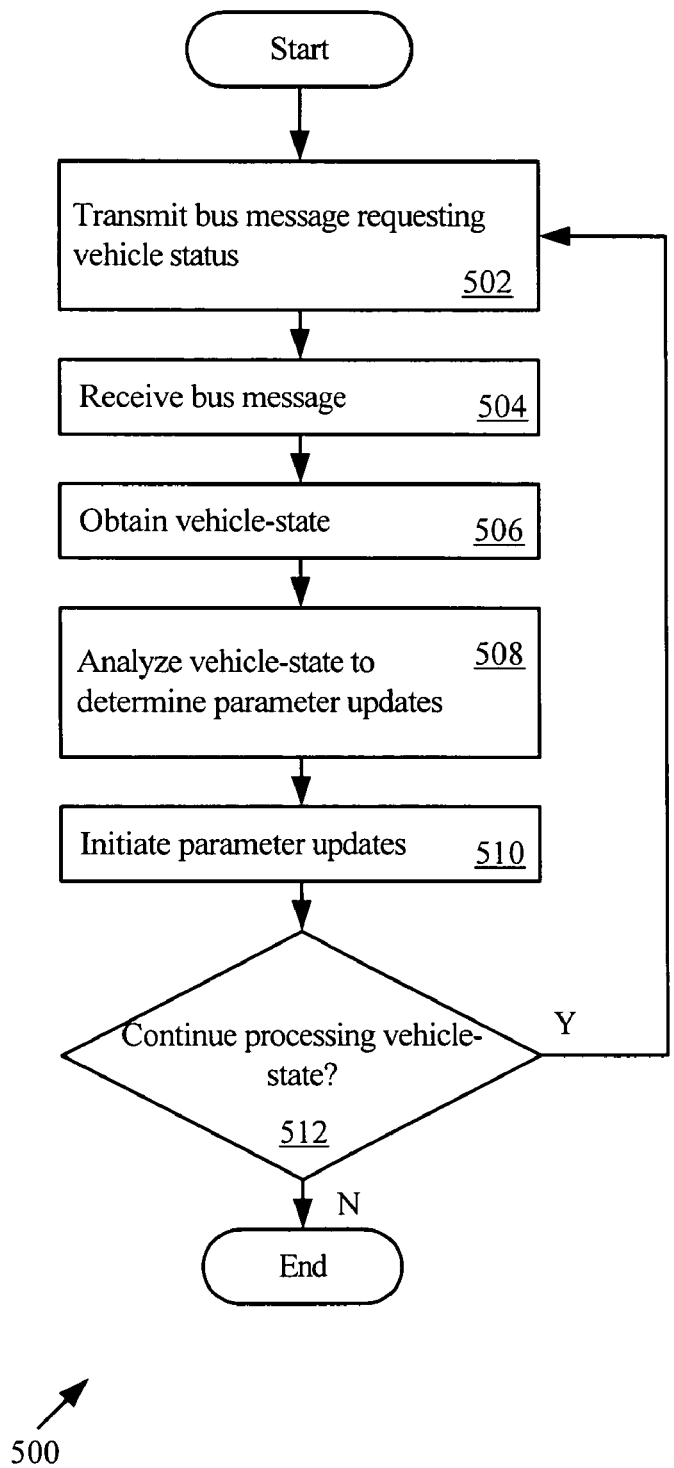
FIG. 5 shows the acts that a vehicle electronics module may take to consider vehicle-state during operation.

In FIG. 5, a flow diagram 500 shows acts taken by the hands-free communication module 104 through programs that may reside in the memory 136. The hands-free communication module 104 may request vehicle-state from one or more electronic modules 104-124 (Act 502). Alternatively or additionally, the hands-free communication module 104 may monitor a bus for vehicle-state 148.

The hands-free communication module 104 receives bus messages (Act 504) and obtains vehicle-state 148 from the bus messages (Act 506). The parameter analysis program 150 may examine the vehicle-state 148 and may determine parameter adjustments 146 (Act 508). For any parameter adjustments, the parameter modification program 152 initiates modifications to the parameters (Act 510). The hands-free communication module 104 may continue this process (Act 512) for as long as desired.

The description provided above is exemplary. Although selected aspects, features, or components of the implementations are depicted as stored or manipulated by program, data, or multipurpose system memories, all or part of systems and methods consistent with the system may be stored on or read from other machine-readable media, for example, secondary storage devices such as hard disks, floppy disks, and CD-ROMs; electromagnetic signals; or other forms of machine readable media either currently known or later developed.

Furthermore, although this specification describes specific components of a vehicle electronics system, methods, systems, and articles of manufacture may include additional or different components, implemented in logic and/or circuitry. For example, a processor may be implemented as a microprocessor, microcontroller, digital signal processor (DSP), application specific integrated circuit (ASIC), discrete logic, and/or a combination of other types of circuits or logic. The processing acts described above may be implemented by a function, subroutine, or in-line test code present in another program (e.g., a modular program), may be a separate program, may be distributed across several memories, processors or buses, or may be partially or wholly implemented in hardware.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A vehicle electronic module comprising:
   a vehicle interface;

a memory comprising multiple sound processing programs;
a processor coupled to the vehicle interface and the memory, the processor operable to:
receive a vehicle-state through the vehicle interface;
determine a selected sound processing program from the multiple sound processing programs based on the vehicle state; and
activate the selected sound processing program to adaptively change ongoing processing of audio signals.

2. The vehicle electronic module of claim 1, where the selected sound processing program adjusts a mobile phone processing parameter.

3. The vehicle electronic module of claim 1, where the selected sound processing program adjusts a hands-free phone processing parameter.

4. The vehicle electronic module of claim 1, where the selected sound processing program adjusts a beamforming parameter.

5. The vehicle electronic module of claim 1, where the selected sound processing program adjusts a noise reduction parameter.

6. The vehicle electronic module of claim 1, where the selected sound processing program adjusts an echo cancellation parameter.

7. The vehicle electronic module of claim 1, where the selected sound processing program adjusts a programmable filter parameter.

8. The vehicle electronic module of claim 1, where the selected sound processing program adjusts a frequency response parameter.

9. The vehicle electronic module of claim 1, where the vehicle-state comprises vehicle speed data.

10. The vehicle electronic module of claim 1, where the vehicle-state comprises aperture opening data.

11. The vehicle electronic module of claim 10, where the aperture opening data comprises window opening data or roof opening data or both.

12. The vehicle electronic module of claim 1, where the vehicle-state comprises climate control setting data.

13. The vehicle electronic module of claim 1, where the vehicle-state comprises audio system setting data.

14. The vehicle electronic module of claim 1, where the vehicle-state comprises occupancy data.

15. The vehicle electronic module of claim 1, where the selected sound processing program adjusts a gain level parameter.

16. The vehicle electronic module of claim 1, where the vehicle interface comprises a wireless interface.

17. The vehicle electronic module of claim 1, where the multiple sound processing programs comprise an echo cancellation program and a noise suppression program, and where the processor is operable to determine the selected sound processing program from the echo cancellation program and the noise suppression program based on the vehicle state.

18. The vehicle electronic module of claim 1, where the multiple sound processing programs comprise an echo cancellation program, a noise suppression program, and a beamformer program, and where the processor is operable to determine the selected sound processing program from the echo cancellation program, the noise suppression program, and the beamformer program based on the vehicle state.

19. The vehicle electronic module of claim 1, where the multiple sound processing programs comprise an echo cancellation program, a noise suppression program, a beamformer program, and a wind buffet suppression program, and where the processor is operable to determine the selected sound processing program from the echo cancellation program, the noise suppression program, the beamformer program, and the wind buffet suppression program based on the vehicle state.

20. The vehicle electronic module of claim 1, where the processor is operable to determine the vehicle-state from a vehicle bus message received through the vehicle interface.

21. The vehicle electronic module of claim 20, where the vehicle bus message comprises window data, speed data, climate control data, occupancy data, and audio system data.

22. The vehicle electronic module of claim 1, where the vehicle-state comprises climate control data that indicates an air-conditioning setting level, a heating setting level, or a fan setting level, and where the processor is operable to determine the selected sound processing program from the multiple sound processing programs based on the air-conditioning setting level, the heating setting level, or the fan setting level.

23. The vehicle electronic module of claim 1, where the vehicle-state comprises occupancy data that indicates whether an occupant is present within a vehicle, and where the processor is operable to determine the selected sound processing program from the multiple sound processing programs based on the occupancy data.

24. The vehicle electronic module of claim 23, where the occupancy data indicates a position or location of the occupant within the vehicle.

25. The vehicle electronic module of claim 23, where the occupancy data indicates an identity of the occupant.

26. The vehicle electronic module of claim 1, where the selected sound processing program adjusts a beamforming parameter to move a beamforming focus to a different location within a vehicle based on the vehicle-state.

27. The vehicle electronic module of claim 1, where the vehicle-state indicates a detected location of an occupant in a vehicle, and where the selected sound processing program adjusts a beamforming parameter to move a beamforming focus to the detected location of the occupant.

28. A communication module comprising:
means for interfacing to a first vehicle bus;
means for receiving a vehicle-state through the first vehicle bus;
means for determining a selected sound processing program from multiple sound processing programs based on the vehicle state; and
means for activating the selected sound processing program to adaptively change ongoing processing of audio signals.

29. The communication module of claim 28, further comprising means for interfacing to a second vehicle bus.

30. A vehicle electronic module comprising:
a first vehicle network interface;
a second vehicle network interface that automatically detects a protocol of a first vehicle network and a second vehicle network;
a processor coupled to the first vehicle network interface and the second vehicle network interface;
a memory coupled to the processor, the memory storing:
a vehicle state, updated over time by one or more vehicle bus messages that comprise vehicle operation data, climate control setting data, and entertainment system data, received from the first vehicle network interface or the second vehicle network interface;
a hands-free communication processing parameter;
vehicle state analysis instructions;
an adjustment to the hands-free communication processing parameter, the adjustment determined by the vehicle state analysis instructions in response to updated vehicle states; and modification instructions that initiate an adjustment of the hands-free communication processing parameter in accordance with the adjustment.

31. The vehicle electronic module of claim 30, where the vehicle state comprises a vehicle speed.

32. The vehicle electronic module of claim 30, where the vehicle state comprises window or roof opening data or climate control setting data, or both.

33. The vehicle electronic module of claim 30, where the adjustment comprises a noise reduction parameter adjustment, amplification parameter adjustment, or a filter parameter adjustment, or a combination thereof.

34. The vehicle electronic module of claim 30, where the adjustment comprises an echo cancellation parameter adjustment.

35. The vehicle electronic module of claim 30, where the adjustment comprises a beamforming beam width or beam focus parameter adjustment or both.

36. The vehicle electronic module of claim 30, where the memory further stores:

multiple sound processing programs, each comprising processing parameters; and an analysis program operable to determine to modify the hands-free communication processing parameter from among the processing parameters for the multiple sound processing programs, and further operable to determine the adjustment.

37. The vehicle electronic module of claim 30, where the processor is operable to:

analyze window data received from the one or more vehicle bus messages to determine aperture opening information;

analyze speed data received from the one or more vehicle bus messages to determine a speed of a vehicle;

analyze the climate control setting data to determine an air-conditioning setting level, a heating setting level, or a fan setting level;

analyze occupancy data received from the one or more vehicle bus messages to determine a position or location of one or more occupants within the vehicle;

analyze the entertainment system data to determine an audio system volume level; and calculate the adjustment to the hands-free communication processing parameter based on one or more of the window data, the speed data, the climate control setting data, the occupancy data, or the entertainment system data.

38. A vehicle electronic module comprising:

a memory comprising multiple sound processing programs;

a processor coupled to the memory, the processor operable to:

process data from a vehicle bus message that comprises window data, speed data, climate control data, occupancy data, and audio system data;

analyze the window data to determine aperture opening information;

analyze the speed data to determine a speed of a vehicle;

analyze the climate control data to determine an air-conditioning setting level, a heating setting level, or a fan setting level;

analyze the occupancy data to determine a position or location of one or more occupants within the vehicle;

analyze the audio system data to determine an audio system volume level;

determine one or more selected sound processing programs from the multiple sound processing programs based on one or more of the window data, the speed data, the climate control data, the occupancy data, or the audio system data; and activate the one or more selected sound processing programs to adaptively change ongoing processing of audio signals.

39. The vehicle electronic module of claim 38, where the multiple sound processing programs comprise an echo cancellation program, a noise suppression program, and a beamformer program, and where the processor is operable to determine the selected sound processing program from the echo cancellation program, the noise suppression program, and the beamformer program based on the vehicle state.

* * * * *